(12) United States Patent
Moskala et al.

(10) Patent No.: US 6,458,468 B1
(45) Date of Patent: Oct. 1, 2002

(54) PHOTOCURABLE COATINGS FOR POLYESTER ARTICLES

(75) Inventors: Eric Jon Moskala; Louis Thomas Germinario; David Gayle Salyer, all of Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/489,408

(22) Filed: Jan. 21, 2000

Related U.S. Application Data

(60) Provisional application No. 60/117,529, filed on Jan. 28, 1999, and provisional application No. 60/118,100, filed on Feb. 1, 1999.

(51) Int. Cl.[7] ............................................... B32B 27/08
(52) U.S. Cl. ..................... 428/515; 428/413; 428/423.1; 428/447; 428/479.9; 428/480; 428/500; 428/515; 428/529
(58) Field of Search ................................. 428/500, 413, 428/474, 4, 480, 515, 529, 447, 423.1

(56) References Cited

U.S. PATENT DOCUMENTS

| | | | |
|---|---|---|---|
| 4,058,400 A | | 11/1977 | Crivello |
| 4,161,478 A | * | 7/1979 | Crivello ..................... 260/327 |
| 4,197,173 A | | 4/1980 | Curry et al. |
| 4,198,465 A | | 4/1980 | Moore et al. |
| 4,348,431 A | | 9/1982 | O'Malley |
| 4,384,026 A | | 5/1983 | Moore et al. |
| 4,557,975 A | | 12/1985 | Moore |
| 4,569,869 A | | 2/1986 | Kushida et al. |
| 4,929,506 A | | 5/1990 | Kerr, III et al. |
| 5,086,087 A | | 2/1992 | Misev |
| 5,106,885 A | | 4/1992 | Liu et al. |
| 5,200,490 A | | 4/1993 | Jaeger et al. |
| 5,236,968 A | | 8/1993 | Hirschmann |
| 5,300,334 A | | 4/1994 | Niederst et al. |
| 5,494,618 A | * | 2/1996 | Sitzmann .................... 264/401 |
| 5,569,498 A | | 10/1996 | Rigamonti et al. |
| 5,571,570 A | | 11/1996 | Lake |
| 5,681,628 A | | 10/1997 | Niederst et al. |
| 5,705,116 A | | 1/1998 | Sitzmann et al. |
| 5,888,649 A | * | 3/1999 | Curatolo ..................... 428/352 |
| 6,127,447 A | * | 10/2000 | Mitry et al. ................. 522/107 |

FOREIGN PATENT DOCUMENTS

WO  WO 92/14764 A1  9/1992

OTHER PUBLICATIONS

"UV and EB Curing Formulation for Printing Ink, Coatings and Paints" edited by R. Holman, published by SITA–Technology Ltd., 203 Gardiner House, Broomhill Road, London SW18, England (1984) and "Chemistry & Technology of UV and EB Formulation for Coatings, Inks and Paints", vol. I–IV, edited by P.K.T. Oldring, published by SITA Technology Ltd., (1991).

E. V. Sitzmann, R. F. Anderson, J. G. Cruz, S. A. Bratslavsky and R. L. Haynes, "Combining vinyl ethers with acrylates for enhanced performance in UV cured coatings", RadTech98 Conf. Proc. (1998).

Derwent Publications Ltd., London, GB; AN 1998–105234 XP002136609 & JP 09 328634 A (Toyo Ink Mfg Co Ltd), Dec. 22, 1997 Abstract.

\* cited by examiner

*Primary Examiner*—Blaine Copenheaver
*Assistant Examiner*—Christopher Paulraj
(74) *Attorney, Agent, or Firm*—Bernard J. Graves, Jr.; Karen A. Harding; J. Frederick Thomsen

(57) ABSTRACT

Coated articles having improved chemical resistance comprising an article formed from a moldable polymer coated on at least one surface with a coating composition comprising at least one vinyl ether oligomer compound, and at least one photoinitiator are disclosed. Coatings which also contain at least one acrylate compound and/or at least one epoxy compound are also disclosed. The articles are preferably made from polyesters. Methods for coating such articles are also disclosed.

27 Claims, No Drawings

PHOTOCURABLE COATINGS FOR POLYESTER ARTICLES

RELATED APPLICATIONS

This application claims the benefit of provisional application U.S. Ser. No. 60/117,529 filed on Jan. 28, 1999 and U.S. Ser. No. 60/118,100, filed Feb. 1, 1999.

FIELD OF THE INVENTION

The present invention relates generally to polyester articles coated with a bendable and stress crack resistant photocured coating. The polyesters contain dibasic acid moieties comprising at least 80 mole % terephthalic, naphthalene dicarboxylic, isophthalic and/or 1,4-cyclohexanedicarboxylic acid and glycol moieties derived from ethylene glycol and 1,4-cyclohexanedimethanol.

BACKGROUND OF THE INVENTION

Environmental stress cracking is the crazing and/or cracking that may occur when a thermoplastic under a tensile stress is exposed to aggressive chemicals. It is undesirable because it detracts from the aesthetic appearance of the plastic and, more importantly, could lead to mechanical failure of the molded article formed from the plastic. The potential for environmental stress cracking is of paramount concern when plastics are used in applications as diverse as injection-molded medical packaging and parts and blow-molded carbonated soft drink containers, where mechanical failure can have unwelcome ramifications.

Thermoplastics commonly coated for the purpose of improving stress crack resistance include polyethylene and polycarbonate. Poly(ethylene terephthalate) (PET) and other polyesters are less commonly coated for this purpose. Heat cured siloxane systems, which are disclosed in U.S. Pat. No. 4,348,431 and commonly applied to polycarbonate plastics do not work on PET because the curing temperature is too high. This coating system is also expensive since it requires drying ovens and a curing time which may be as long as 4 hours. Polyurethane coatings, such as those disclosed in U.S. Pat. Nos. 5,300,334 and 5,681,628, also require undesirably long curing times and high temperatures for use on PET carbonated soft drink containers). The photocurable acrylate siloxane system disclosed in U.S. Pat. No. 4,197,173 and supplied by GE Plastics exhibits poor adhesion to PET copolyesters and the coating is brittle. The photocurable acrylate used by Yoshino Kogyosho for PET bottles require a primer coating in order to achieve adhesion of the acrylate to the substrate (U.S. Pat. No. 4,569,869). Acrylate coatings in general are stiff films and even if they adhere to PET, they result in the loss of impact properties and bendability.

"UV and EB Curing Formulation for Printing Ink, Coatings and Paints" edited by R. Holman, published by SITA-Technology Ltd., 203 Gardiner House, Broomhill Road, London SW18, England (1984) and "Chemistry & Technology of UV and EB Formulation for Coatings, Inks and Paints", Volumes I–IV, edited by P. K. T. Oldring, published by SITA Technology Ltd., (1991) disclose general methods and compositions for coating plastic substrates.

U.S. Pat. Nos. 5,300,334 and 5,681,628 describe a pressurizable thermoplastic container having an exterior polyurethane layer and its method of making. The solvent -based polyurethane was cured at 60° C. for 10 minutes.

U.S. Pat. No. 4,569,869 discloses a saturated polyester bottle-shaped container with hard coating and method of fabricating the same. The hard coating is a UV-cured methyl methacrylate resin. The polyester bottle was coated with a primer layer prior to coating with the hard coat in order to promote adhesion of the hard coat to the container.

U.S. Pat. No. 4,348,431 discloses a continuous coating process for plastic films including polycarbonates, polyesters (PET and PBT), acrylic resins and others in which an aqueous dispersion of colloidal silica in an aliphatic alcohol-water solution of an organosilicon compound is applied and cured at elevated temperatures.

U.S. Pat. No. 5,086,087 describes a coating composition containing UV curable unsaturated monomers and/or oligomers, a photoinitiator and colloidal silica with an organosilane compound. The examples illustrate putting the coatings on polycarbonate samples.

U.S. Pat. No. 4,557,975 describes curing of a photocurable coating mixture containing polyfunctional acrylates, acrylonitrile, and a photoinitiator on polymeric substrates, especially the polycarbonates.

Many coatings have been disclosed as useful for coating polycarbonates. For example, U.S. Pat. No. 5,571,570 describes using a UV curable blend of three acrylic modified aliphatic polyurethanes, U.S. Pat. No. 4,197,173 describes a photocurable composition containing a polythiol, a polyene, and a silicone modified polyester copolymer, U.S. Pat. No. 4,198,465 describes a photocured coating containing the photoreaction products of certain multifunctional acrylate ester monomers or mixtures thereof and resorcinol monobenzoate, U.S. Pat. No. 4,384,026 describes photocured coatings containing the reaction of certain multifunctional acrylate ester monomers and certain acrylate modified polymers, U.S. Pat. No. 4,929,506 describes a hard, abrasion and chemical resistant coating which is the photoreaction product of an acrylated urethane oligomer, a difunctional acrylate monomer and preferably also a monofunctional olefinic monomer and U.S. Pat. No. 5,236,968 describes a UV hardenable lacquer.

Therefore, there remains a need in the art for solventless coating compositions which would adhere well to PET and other polyesters, be bendable, and provide good resistance to environmental stress cracking.

DETAILED DESCRIPTION OF THE INVENTION

It has been found that UV-curable coatings can be applied to the surface of films, sheeting, and molded objects of certain polyesters to provide bendable, stress crack resistant coatings with good adhesion to the substrate.

More specifically the present invention relates to improving stress crack performance of a polyester article by applying an UV-curable, stress crack resistant topcoat to one or more sides. By increasing the resistance of the surface to stress cracking, the polyester can be used more safely in existing applications as well as find applications in more aggressive environments.

Polyesters

Polyesters which are suitable for use in the present invention include crystallizable polyester homopolymer or copolymer that are suitable for use in packaging, and particularly food packaging. Suitable polyesters are generally known in the art and may be formed from aromatic dicarboxylic acids, esters of dicarboxylic acids, anhydrides of dicarboxylic esters, glycols, and mixtures thereof. More preferably the polyesters are formed from repeat units comprising terephthalic acid, dimethyl terephthalate, isophthalic acid, dimethyl isophthalate, dimethyl-2,6-naphthalenedicarboxylate, 2,6-naphthalenedicarboxylic acid, ethylene glycol, diethylene glycol, 1,4-cyclohexanedimethanol, 1,4-butanediol, and mixtures thereof.

The dicarboxylic acid component of the polyester may optionally be modified with up to about 15 mole percent of one or more different dicarboxylic acids. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included with terephthalic acid are: phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, mixtures thereof and the like.

In addition, the glycol component may optionally be modified with up to about 15 mole percent, of one or more different diols other than ethylene glycol. Such additional diols include cycloaliphatic diols preferably having 6 to 20 carbon atoms or aliphatic diols preferably having 3 to 20 carbon atoms. Examples of such diols include: diethylene glycol, triethylene glycol, 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-Q1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane, mixtures thereof and the like. Polyesters may be prepared from two or more of the above diols.

The resin may also contain small amounts of trifunctional or tetrafunctional comonomers such as trimellitic anhydride, trimethylolpropane, pyromellitic dianhydride, pentaerythritol, and other polyester forming polyacids or polyols generally known in the art.

The polymers may be prepared from the dibasic acids or their synthetic equivalents such as their lower alkyl esters. If esters are used, the methyl esters are preferred. The polyesters will generally have inherent viscosity values of about 0.5 to about 1.5, but those with values of about 0.6 to about 1.0 are preferred.

Polyesters suitable for use in the present invention may be made by the generally known three-stage polyesterification process. The three polymerization stages are hereinafter referred to as the esterification stage, the prepolymer stage, and the polycondensation stage. Conditions for these stages are well known in the art, and summarized below.

In the first stage of the melt-phase process, a mixture of polyester monomer (diglycol esters of dicarboxylic acids) and oligomers are produced by conventional, well-known processes. The ester exchange or esterification reaction is conducted at a temperature between about 220° C. to about 250° C. and a pressure of about 0 to about 20 psig in the presence of suitable ester exchange catalysts such as lithium, magnesium, calcium, manganese, cobalt and zinc, or esterification catalysts such as hydrogen, titanium or suitable forms of which are generally known in the art. The catalysts can be used alone or in combination. Preferably the total amount of catalyst is less than about 100 ppm on an elemental basis. The reaction is conducted for about 1 to about 4 hours. It should be understood that generally the lower the reaction temperature, the longer the reaction will have to be conducted.

Generally at the end of the esterification, a polycondensation catalyst is added. Suitable polycondensation catalysts include salts of titanium, gallium, germanium, tin, antimony and lead, preferably antimony or germanium or a mixture thereof. Preferably the amount of catalyst added is between about 90 and 150 ppm when germanium or antimony is used. Suitable forms such as, but not limited to antimony oxide are well known in the art. The prepolymer reaction is conducted at a temperature less than about 280° C., and preferably between about 240° C. and 280° C. at a pressure sufficient to aid in removing undesirable reaction products such as ethylene glycol. The condensation stage may be conducted either continuously or in one or more batch reactors.

Next, the mixture of polyester monomer and oligomers undergoes melt-phase polycondensation to produce a low molecular weight precursor polymer. The precursor is produced in a series of one or more reactors operating at temperatures between about 240° C. to about 280° C. and a pressure between about 0 and 2 mm Hg. The reactors may be purged with an inert gas. Inert gas is any gas that does not cause unwanted reaction or product characteristics. Suitable gases include, but are not limited to $CO_2$, argon, helium and nitrogen.

Once the desired inherent viscosity is reached, the polymer is pelletized. Precursor I.V. is generally below about 0.7. Inherent viscosity (I.V.) was measured at 25° C. using 0.50 grams of polymer per 100 ml of a solvent consisting of 60% by weight phenol and 40% by weight tetrachloroethane.

The polyesters used in the present invention may also include a variety of additives depending on the end use for the polymer. Such additives include, but are not limited to colorants, toners, pigments, carbon black, glass fibers, fillers, impact modifiers, antioxidants, slip agents, denesting agents, stabilizers, barrier enhancing compounds, flame retardants, reheat aids, acetaldehyde reducing compounds and the like.

The polymers are formed into articles. Articles suitable for coating in the present invention include sheet, film, tubing, profiles, preforms, fiber, woven and shaped articles, such as containers, thermoformed articles such as trays and the like. The articles are formed by conventional processes such as extrusion, thermoforming, injection and stretch blow molding, injection molding, spinning. drawing and the like. These processes are known in the art.

The coatings may be applied to all or part of at least one surface. For example, where stress crack or scuff resistance is desired the coatings may be beneficially applied to all or part of the outside of the article. Some applications may require coatings in high contact areas, such as the base region of a container, while other applications may benefit from coating the entire interior or exterior of the article. Containers displaying improved stress crack resistance and scuff resistance are an example. In other application, the coating may be beneficially applied to the inside of the article to provide chemical resistance to chemicals which the article comes in contact with during use.

Coating Compositions

Suitable coating compositions for use in the present invention comprise at least one vinyl ether compound and at least one photoinitiator. Coating compositions of the present invention may also include, acrylate, urethane, or epoxy, monomers or oligomers and mixtures thereof, and photoinitiators. The selection of the coating composition components and their amounts will depend on the composition of the article to be coated and the properties which are critical for the end use application. The preferred components of the coating compositions are those that provide adequate wetting of the polymer matrix surface during application. Without being bound by any particular theory, it is believed that monomer compounds which are compatible with the polymer and act as a solvent and diffuse into the matrix upon coating are preferred. Curing causes the monomer compounds to polymerize into the matrix, thereby providing excellent adhesion between the coating and the matrix polymer.

It is preferred that the liquid coating is cured immediately after application by irradiation with UV light or other suitable radiation source. The thickness of the cured coating will generally range from about 0.05 to about 5 mil. The preferred coating thickness is about 0.1 to about 1.0 mil, although thinner coatings may be effective in improving stress crack resistance to chemicals such as alcohols, surfactants and lubricants.

Vinyl Ether Compounds

Vinyl ether compounds which are suitable for use in the present invention include vinyl ether monomer and oligomers which are generally known in the art and may be described as:

(R'CH=CR"—OZ)$_n$-A where R' and R" may be the same or different and are independently selected from H or an alkyl group having 1 to 10 carbon atoms; A is a moiety derived from urethanes, phenols, polyesters, polyethers, polycarbonates, or polysiloxanes and has a molecular weight of about 400 to 10,000; Z is a moiety derived from a saturated aliphatic or cycloaliphatic hydrocarbon or a polyalkylene ether and has a molecular weight of about 28 to 250; n is an integer from 2 to 6, preferably 2 or more.

Examples of preferable vinyl ether monomers and oligomers used in the present invention are 1-Butanol-4-(ethenyloxy)-benzoate (VE3010), Pentanedioic acid bis[[4-[(ethenyloxy)methyl]ester(VE4020), Butanedioic acid bis[4-(ethynyloxy)butyl]ester(VE4030), Carbamic acid (methylene di-4,1-phenylene) bis-bis[4-(ethynyloxy)butyl] ester(VE4210), Carbamic acid (methyl-1,3-phenylene)bis-, bis[4-(ethynyloxy)butyl]ester(VE4220), mixtures thereof and the like. All of the foregoing compounds are commercially available from AlliedSignal, Inc.

Among the most desirable vinyl ether monomers used in the present invention are Cyclohexane methanol 4-[(ethenyloxy) methyl]- benzoate(VE3040), 1,3-Benzenedicarboxylic acid bis[4-(ethenyloxy) butyl]ester (VE4010), Hexanedioic acid bis[4-ethynyloxy) butyl]ester (VE4060), and 1,2,4-Benzenetricarboxylic acid tris[4-(ethynyloxy) butyl]ester(VE5015).

The vinyl ether compounds may be present in amounts up to about 100 weight %, preferably from about 5 to about 100 weight % and in some embodiments more preferably between about 20 to about 100 weight %. In addition, the mono-, di- and trifunctional vinyl ether monomers are used for diluency, as generally known in the art.

Acrylates

Suitable acrylates include acrylate oligomers. Examples of acrylate oligomers include acrylated aliphatic urethane oligomers such as Ebecryl 8804 (UCB Chemical), and ethoxylated bisphenol A diacrylate, SR 349, (Sartomer), mixtures thereof and the like. Such coatings containing vinyl ether/acrylate exhibit excellent abrasion resistance, flexibility and high modulus when cured. (Sitzmann et. al., RadTech98 Conf. Proc. (1998). The acrylates may be present in amounts up to about 100 weight %, preferably from about 10 to about 100 weight % and in some embodiments more preferably between about 50 to about 90 weight %.

Epoxies

Epoxies, when combined with vinyl ethers, are most useful for the present invention when they display as many of the following properties as possible. Epoxies should have a functionality of at least two, i.e., they should have at least two oxirane moieties for each molecule, have a low cure rate, i.e., cure at least about 5 times slower (at least about 5 seconds), relative to the vinyl ethers used in the formulation, provide a low viscosity to the formulation, and are completely miscible with selected vinyl ethers. In general, the vinyl ether will rapidly set up an initial polymer network, while the slower curing epoxies react to form a secondary network within the vinyl ether network structure.

Epoxies derived from phenols, particularly bisphenol A, novolacs, linear and cycloaliphatic polyols, polyether polyols and siloxanes are preferred. Examples of epoxies that are most preferable in the present invention are bisphenol A diglycidyl ethers (such as DER 331, 332, Dow Chemical and Epon 828, Shell Chemical), epoxy novolacs (such as DEN 431, Quatrex 240, Dow Chemical), epoxy cresols (such as Quatrex 3310, Dow Chemical), and cycloaliphatic epoxides (such as ERL 4221, ERL 4299, ERL 4234, Union Carbide). The epoxies, when present, may be present in amounts up to about 80 weight %, preferably from about 10 to about 80 weight % and in some embodiments more preferably between about 10 to about 70 weight %. It should be appreciated that coating compositions with high epoxy contents (greater than about 60 weight %) will have slower cure times than those with lower epoxy contents.

Formulation of Polymer Precursor Composition

An important aspect for selection of composition is the viscosity of the final formulation. A general range of viscosity for use as polymer coating is in the range from about 50 to about 50,000 mPas, and preferably about 50 to about 5000 mPas, (as measured with a Brookfield (DV-I) viscometer). The viscosity of the formulation should be low in order to facilitate spray coating, as in certain embodiments this process is preferable over roll coating, rod coating, brushing or dipping. In certain embodiments it is preferred that the coating change the optical properties of the article being coated as little as possible. This is particularly important in packaging applications, such as food and medical, where seeing the contents is important. In these applications it is preferred that the clarity and color of the article be changed no more than 5%, and preferably not at all. Percent haze measurements are obtained according to ASTM D- 1003 using a Hunter Lab Ultrascan Colorimeter. The b* values (a measure of yellowness) are measured in accordance with ASTM D-2244-93 using 4" by 4" sections of the article (for example a bottle sidewall) on a Hunter Lab Ultrascan Instrument.

The proportion of vinyl ethers and epoxies used in formulations of the present invention is disclosed in U.S. Pat. No. Pat. No. 5,705,116, the disclosure of which is incorporated herein by reference. The proportions of vinyl ethers and epoxides is defined by the formula: M=F/E. Where M is the vinyl ether equivalent weight of the composition, F is the total weight of the composition, in grams, which includes both vinyl and epoxy compounds, and E is the number of ether equivalents in the composition. The vinyl ether equivalent may be calculated by the molecular weight of the vinyl ether by the number of reactive groups. Accordingly, the vinyl ether equivalent weight (M) should be between about 80 and about 800 and preferably between about 120 and about 450.

The coating formulation of the present invention also includes at least one photoinitiator for cationic curing of vinyl ethers and vinyl ether/epoxy formulations. Cationic polymerization conditions are required for epoxies, as epoxies cure by a cationic mechanism rather than radical conditions, while vinyl ethers can cure by either cationic or radical mechanisms. Suitable photoinitiators are known in the art and disclosed in U.S. Pat. No. 4,058,400, the disclosure of which is incorporated herein by reference. Preferred cationic photoinitiators include the onium salts of Group V, VI and VII elements. More preferred photoinitiators include triarylsulfonium salts, diaryliodonium salts and mixtures thereof. Preferred anions are hexafluorophosphate and hexafluoroantimonate. Examples of commercial sources of triarylsulfonium hexafluoroantimonates are CD 1010 (Sartomer), and UVI 6974 (Union Carbide) and triarylsulfonium hexafluorophosphate UVI-6990 (Union Carbide). Sulfonium salts are preferred as photoinitiators for cationic cure, because of their excellent thermal stability and high quantum yield to produce strong Bronsted acids. Accordingly, photoinitiators are usually required in amounts from about 0.1 to 5 wt % in the blended formula of vinyl ethers and epoxies.

The physical properties of the resulting coating, such as, modulus, elongation, adhesion, shrinkage, and abrasion resistance, etc., can be ascribed to the degree of crosslinking, chain length and the intrinsic properties of the chemical moeity that comprise the bulk of the repeat unit chain.

The coatings are readily applied by techniques well known in the art. Such methods include roll coating, rod coating, spray coating, brushing, dipping and the like. For many articles spray coating will be preferred. It is preferred that the liquid coating is cured immediately after application with UV light or other suitable radiation source. The thickness of the cured coating will generally range from about 0.05 to about 5 mil. The preferred coating thickness is about 0.1 to about 1.0 mil, although thinner coatings may be effective in improving stress crack resistance to chemicals such as alcohols, surfactants and lubricants. The preferred coating is also optically clear.

Examples of photocuring equipment and conditions used to cure film compositions described in the present invention include RPC model QC- 1202 processor equipped with two medium pressure mercury arc lamps and variable conveyor speed from about 50 to about 500 ft/min. The most preferred equipment used for photocuring coatings employ microwave-powered lamps, D-type bulb in particular, supplied by Fusion UV Systems. Although a variety of bulb types are available, D-type bulbs are preferred due to their high energy output and wide spectral range, from about 275 to about 445 run. This spectral range includes the spectral frequency range, about 300 to about 350 nm, required for optimum response for cationic photoinitiators most commonly employed in coatings that are the subject of the present invention. This combination of high-energy output and narrow band emission are useful for providing cure times of about 1 sec. and less.

Sitzrnann et. al., RadTech98 Conf. Proc. (1998) reported a correlation between lamp dose and conveyor belt speed which was expressed as dose $(mJ/cm^2)=25987/$(belt speed, ft/min) and having a correlation of $R^2>0.99$. Tack-free cure doses for vinyl ether/acrylate coatings up to about 6 mil thick was measure to be less than about 22 $mJ/cm^2$. Conveyor belt speeds of about 1200 ft/min are preferred to produce such tack-free coatings. Typical doses required to reach an ultimate modulus for vinyl ether/acrylate hybrid formulations was about 400 to about 1000 $mJ/cm^2$. The dose required to cure vinyl ether-polyesters was typically from up to about 75 $mJ/cm^2$ and up to about 400 $mJ/cm^2$, for the vinyl ether-polyurethane compositions.

Adhesion of the fully cured coating to the polyester substrate as measured by Test Method B of ASTM D3359 Standard Test Methods for Measuring Adhesion by Tape Test is such that zero area is removed from the substrate using Permacel 99 tape manufactured by Permacel, New Brunswick, N.J. The test results reported in Table 9 show that although all examples pass the environmental stress-cracking test, examples 1 and 6 fail the adhesion test. The preferred coating compositions should therefore meet the following criteria of no crazing and 0% (None) of the coating removed using Test Method B of ASTM D3359 Standard Test Methods for Measuring Adhesion by Tape Test.

The elongation to break of the fully cured film should exceed about 10%, and preferably 10% as measured by ASTM D882 Standard Test Method for Tensile Properties of Thin Plastic Sheeting.

The following examples will further illustrate the invention.

EXAMPLES 1–7

The UV-curable coating composition was prepared from the ingredients listed in Tables 1 through 7, below.

TABLE 1 vinyl ether/acrylate monomer coating composition

| Ingredients | Composition |
|---|---|
| Ebecryl 8804[1] | 65.7% |
| N-vinyl pyrrolidinone | 26.5% |
| VE 5015[2] | 8% |
| Irgacure 184[3] | 3 pph |

[1]Ebecryl 8804 is an acrylated aliphatic urethane oligomer from UCB Chemicals.
[2]VE 5015 is 1,2,4-Benzenetricarboxylic acid, tris[4-(ethenyloxy) butyl] ester from AlliedSignal, Inc.
[3]Irgacure 184 is a photoinitiatior from Ciba Specialty Chemicals.

TABLE 2 coating composition based on vinyl ether and acrylate monomers

| Ingredients | Composition |
|---|---|
| Ebecryl 8804 | 80% |
| VB 4060[1] | 20% |
| Irgacure 651[2] | 2 pph |

[1]VE 4060 is hexanedioic acid, bis[4-(ethenyloxy) butyl] ester from AlliedSignal, Inc.
[2]Irgacure 651 is a photoinitiator from Ciba Specialty Chemicals.

TABLE 3 coating composition based on vinyl ether and epoxy monomers

| Ingredients | Composition |
| --- | --- |
| VE 4010[1] | 25% |
| VE 3040[2] | 20% |
| VE 1312[3] | 20% |
| DER 331[4] | 25% |
| CD 1010[5] | 0.5 pph |

[1]VE 4010 is 1,3-benzenedicarboxylic acid, bis[4(ethenyloxy) butyl] ester from AlliedSignal, Inc.
[2]VE 3040 is cyclohexanemethanol, 4-[(ethenyloxy)methyl]-, benzoate from AlliedSignal, Inc.
[3]VE 1312 is a polyfunctional vinyl ether from AlliedSignal, Inc.
[4]DER 331 is the glycidyl ether of bisphenol A from Dow Chemical Company.
[5]CD 1010 is a triarylsulfonium hexafluoroantimonate from Sartomer Company.

TABLE 4

Coating composition based on vinyl ether and epoxy monomers

| Ingredients | Composition |
| --- | --- |
| VE 4010 | 52.3% |
| DER 331 | 47.7% |
| CD 1010 | 0.47 pph |

TABLE 5 coating composition based on vinyl ether monomers and oligomers

| Ingredients | Composition |
| --- | --- |
| VE 4010 | 50% |
| VE 1221[1] | 50% |
| CD 1010 | 0.5 pph |

[1]VE 1221 is an aromatic polyester divinyl ether from AlliedSignal, Inc.

TABLE 6 coating composition based on vinyl ether monomers and oligomers

| Ingredients | Composition |
| --- | --- |
| VE 4010 | 50% |
| VE 1312 | 50% |
| CD 1010 | 0.5 pph |

TABLE 7 coating composition based on vinyl ether monomers and oligomers

| Ingredients | Composition |
| --- | --- |
| VE 4010 | 50% |
| VE 1214[1] | 50% |
| CD 1010 | 0.5 pph |

[1]VE 1214 is a vinyl ether oligomer from Allied Signal Inc.

The ingredients in each of the foregoing Tables were mixed together to form the coating compositions of Examples 1–7, respectively, which was applied to 20-mil thick PET copolyester (Eastar Copolyester PETG 6763, from Eastman Chemical Company) sheet. Each coating was cured by exposure for 1 sec using a PRC model QC-1202 processor equipped with two medium-pressure mercury arc lamps and a conveyor.

Coated sheet samples were evaluated for stress crack resistance by exposure to various aggressive chemical environments which included exposure to rubbing alcohol, Triton X-100, and Myvacet 9-45, while under a constant bending strain of 1.5%. The results of the stress crack testing are reported in Table 8, below. As a control, an uncoated PET copolyester sheet was also tested.

TABLE 8

| | Stress Crack Solvent | | |
| --- | --- | --- | --- |
| Example # | Rubbing Alcohol | Triton X-100[1] | Myvacet 9-45[2] |
| 1 | No crazing | No crazing | No crazing |
| 2 | No crazing | No crazing | No crazing |
| 3 | No crazing | No crazing | No crazing |
| 4 | No crazing | No crazing | No crazing |
| 5 | No crazing | No crazing | No crazing |
| 6 | No crazing | No crazing | No crazing |
| 7 | No crazing | No crazing | No crazing |
| Control | Severe crazing | Severe crazing | Severe crazing |

[1]Triton X-100 is a nonionic surfactant from Union Carbide Corporation.
[2]Myvacet 9-45 is an acetylated monoglyceride from Eastman Chemical Company.

Thus, the data in Table 8 clearly shows that all the coatings evaluated in the examples greatly improved the chemical resistance of the sheet.

The coated sheet were also tested for adhesion using Test Method B of ASTM D3359 Standard Test Methods for Measuring Adhesion by Tape Test such that zero area is removed from the substrate using Permacel 99 tape manufactured by Permacel, New Brunswick, N.J. The results of the adhesion tests are shown in Table 9, below.

TABLE 9

CLASSIFICATION OF ADHESION TEST RESULTS

| Ex # | Classification | % area removed |
| --- | --- | --- |
| 1 | 0B | >65 |
| 2 | 5B | 0 |
| 3 | 5B | 0 |
| 4 | 5B | 0 |
| 5 | 5B | 0 |
| 6 | 1B | 35–65 |
| 7 | 5B | 0 |

In Table 9 above, classification is the rating included in ASTM D3359 test method B, wherein 0B is the lowest level of adhesion and 5B is the highest level of adhesion. The test results reported in Table 9 show that although all examples pass the environmental stress-cracking test, examples 1 and 6 fail the adhesion test. Failure of the adhesion test indicates poor compatibility at the interface between the materials. While there are several theories in the art relating to interfacial compatibility it is believed that the coating compounds of Examples 1 and 6 contained monomer components that did not have sufficient compatibility with the polymer matrix to provide enough interpenetration or surface wetting to provide good adhesion. Those skilled in the art will appreciate that the surface energy and adhesion can be improved by several methods, such as corona treatment surface (which will increase surface energy and roughness) and/or changing the coating composition to add additional components having higher compatibility with the polymer matrix. The beneficial effect of including a moiety similar to those in the polymer to be coated can be seen by comparing Example 3 to Example 6. Example 6 displayed poor adhesion, while Example 3, which has all of the components of Example 6, with two additional components (VE 3040 and DER 331), displayed acceptable performance. VE 3040 contains a cyclohexanediol moiety greatly improves compatibility between the coating compound and the substrate surface. Thus, the best adhesion was achieved when the coating formulations included components providing sufficient capability or solubility to provide adequate wetting of the substrate surface during application. Moreover, monomer compounds which are compatible with the polymer matrix may act as a solvent and diffuse into the matrix upon coating. Curing causes the monomer compounds to polymerize into the matrix, thereby providing excellent adhesion between the coating and the matrix polymer.

We claim:

1. A coated article comprising a moldable polyester polymer coated on at least a portion of at least one surface with a coating comprising at least one vinyl ether compound selected from the compounds of the formula:

$$(R'CH=CR''-OZ)_n-A$$

where R' and R" may be the same or different and are independently selected from H or an alkyl group having 1 to 10 carbon atoms; A is a moiety derived from urethanes, phenols, polyesters, polyethers, polycarbonates, or polysiloxanes and has a molecular weight of about 400 to 10,000; Z is a moiety derived from a saturated aliphatic or cycloaliphatic hydrocarbon or a polyalkylene ether and has a molecular weight of about 28 to about 250; n is an integer of 2 or more;

and at least one photoinitiator.

2. The coated article of claim 1 wherein said coating composition further comprises at least one acrylate compound, epoxy compound or mixture thereof.

3. The coated article of claim 1 wherein said coating composition has a viscosity of between about 50 and about 50,000 mPas.

4. The coated article of claim 1 wherein said vinyl ether compound is present in said coating composition in a proportion is defined by the formula:

$$M=F/E$$

Where M is the vinyl ether equivalent weight of the composition, F is the total weight of the composition, in grams, which includes both vinyl and epoxy compounds, and E is the number of ether equivalents in the composition and wherein said vinyl ether equivalent weight (M) is between about 80 and about 800.

5. The coated article of claim 4 wherein said vinyl ether equivalent weight is between about 120 and about 450.

6. The article of claim 1 wherein n is an integer from 2 to 6.

7. The coated article of claim 1 wherein said vinyl ether compound is selected from the group consisting of 1-Butanol-4-(ethenyloxy)-benzoate, Pentanedioic acid bis(((4-(ethenyloxy))methyl)ester, Butanedioic acid bis((4-ethynyloxy)butyl)ester, Carbamic acid(methylene di-4,1-phenylene)bis-bis(4-(ethynyloxy)butyl)ester, Carbamic acid (methyl-1,3-phenylene)bis-bis(4-(ethynyloxy)butyl)ester and mixtures thereof.

8. The coated article of claim 1 wherein said vinyl ether compound is selected from the group consisting of cyclohexane methanol 4-((ethenyloxy) methyl)-benzoate, 1,3-Benzenedicarboxylic acid bis(4-(ethenyloxy) butyl)ester, Hexanedioic acid bis((4-ethynyloxy)butyl)ester, and 1,2,4-Benzenetricarboxylic acid tris(4-(ethynyloxy)butyl)ester.

9. The coated article of claim 1 wherein said coating composition further comprises at least one acrylate compound selected from the group consisting of acrylate oligomers.

10. The coated article of claim 9 wherein said acrylate compound is selected from the group consisting of acrylated aliphatic urethane oligomers.

11. The coated article of claim 9 wherein said acrylate compound is selected from the group consisting of acrylated aliphatic urethane oligomers, and ethoxylated bisphenol A diacrylate, and mixtures thereof.

12. The coated article of claim 1 wherein said coating composition further comprises at least one epoxy compound selected from the group consisting of epoxies having at least two oxirane moieties for each molecule.

13. The coated article of claim 12 wherein said epoxy compound has a cure rate which is slower than the cure rate of said vinyl ether compounds.

14. The coated article of claim 12 wherein said epoxy compound is selected from the group consisting of epoxies derived from phenols, novolacs, linear and cyclo aliphatic polyols, poly ether polyols and siloxanes.

15. The coated article of claim 12 wherein said epoxy compound is selected from the group consisting of bisphenol A diglycidyl ethers, epoxy novolacs, epoxy cresols, cycloaliphatic epoxides and mixtures thereof.

16. The coated article of claim 1 wherein said photoinitiator capable of cationic curing of said vinyl ether compound.

17. The coated article of claim 1 wherein said photoinitiator is selected from the group consisting of onium salts of Group V, VI and VII elements.

18. The coated article of claim 17 wherein said photoinitiator is selected from the group consisting of triarylsulfonium salts, diaryliodonium salts and mixtures thereof.

19. The coated article of claim 18 wherein said salts comprise an anion selected from hexafluorophosphate, hexafluoroantimonate and mixtures thereof.

20. The coated article of claim 1 wherein said photoinitiator is present in said coating composition in an amount about 0.1 to 5 wt %.

21. The coated article of claim 1 wherein said polymer is selected from the group consisting of polyesters, polyolefins, polycarbonates, and polyamides.

22. The coated article of claim 1 wherein said polymer comprises at least one polyester.

23. The coated article of claim 1 wherein said article is selected from the group consisting of a preform, profile, container, sheet, thermoformed article, film, tube, pipe and injection molded part.

24. The coated article of claim 1, wherein said article is a preform or a container.

25. The coated article of claim 23 wherein said coating composition comprises an acrylated aliphatic urethane oligomer; from about 10 to about 30 weight % hexanedioic acid bis(4-(ethenyloxy)butyl)ester and up to about 10 pph said photoinitiator; all based upon the total weight of said coating composition.

26. The coated article of claim 23 wherein said coating composition comprises about 15 to about 35 weight % 1,3-benzenedicarboxylic acid bis(4(ethenyloxy)butyl) ester, about 10 to about 20 weight % cyclohexanemethanol 4-((ethenyloxy)methyl)-benzoate, about 10 to about 20 weight % polyfunctional vinyl ether, about 25 to about 45 weight % glycidyl ether of bisphenol A and up to about 5 pph triarylsulfonium hexafluoroantimonate; all based upon the total weight of said coating composition.

27. The coated article of claim 23 wherein said coating composition comprises from about 30 to about 70 weight % 1,3-benzenedicarboxylic acid bis(4(ethenyloxy)butyl)ester, from about to about 70 to about 30 weight % aromatic polyester divinyl ether and up to about 10 pph triarylsulfonium hexafluoroantimonate; all based upon the total weight of said coating composition.

* * * * *